United States Patent
Terada et al.

(10) Patent No.: US 6,829,074 B2
(45) Date of Patent: *Dec. 7, 2004

(54) LIQUID TYPE ELECTROCHROMIC ELEMENT

(75) Inventors: Yoshiyuki Terada, Fujieda (JP); Takuo Mochizuka, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/416,705

(22) PCT Filed: Oct. 5, 2001

(86) PCT No.: PCT/JP01/08798

§ 371 (c)(1), (2), (4) Date: Oct. 22, 2003

(87) PCT Pub. No.: WO03/032069

PCT Pub. Date: Apr. 17, 2003

(65) Prior Publication Data

US 2004/0057100 A1 Mar. 25, 2004

(51) Int. Cl.$^7$ ................................................. G02F 1/15
(52) U.S. Cl. ........................................ 359/265; 359/267
(58) Field of Search ................................ 359/265, 267, 359/266, 269, 271, 273, 275

(56) References Cited

U.S. PATENT DOCUMENTS 5,668,663 A    9/1997  Varaprasad et al.
5,923,457 A    7/1999  Byker et al.

FOREIGN PATENT DOCUMENTS

| JP | 61-129626 | 6/1986 |
| JP | 61-190528 | 8/1986 |
| JP | 63-249826 | 10/1988 |
| JP | 1-172887 | 7/1989 |
| JP | 3-5135 | 1/1991 |

*Primary Examiner*—Scott J. Sugarman
*Assistant Examiner*—Richard Hanig
(74) *Attorney, Agent, or Firm*—Oblon, Spivak, McClelland, Maier & Neustadt, P.C.

(57) ABSTRACT

A liquid type electrochromio (EC) element is configured by substrates having tapping electrode portions as a part of a unified substrate by the processing of the substrate. When the upper and lower tapping electrode portions are provided on one side such that they are not piled up with each other, the ratio of the effective area can be increased and the area for covering the tapping electrode portions can be decreased in comparison with the technique in which the upper substrates are shifted with each other. Also, since the areas of the tapping electrode portion can be decreased in comparison with the technique in which the upper substrates are shifted with each other, the weight of the EC element can be decreased. Also, the weight can be decreased by dividing the tapping electrode portion into two tapping electrode portions each having such size that one is not piled up with another. Since the tapping electrode portion and the upper electrode portion are not piled up with each other when viewed from the direction of laminating the substrates, the liquid type electrochromic element can be connected via a clip electrode.

9 Claims, 5 Drawing Sheets

(1)

(2)

(3)

Background Art

LIQUID TYPE ELECTROCHROMIC ELEMENT

TECHNICAL FIELD

The present invention relates to an electrochromic element to be used in the control of luminous energy and in a display, and particularly to a liquid type electrochromic element.

BACKGROUND ARTS

The phenomenon that an electrolytic oxidation or an electrolytic reduction reversibly occurs upon applying a voltage to be reversibly colored or discolored refers to electrochromism. An electrochromic (hereinafter sometimes referred to as "EC") element utilizing such a phenomenon has been used in an element for regulating luminous energy (e.g., an antiglare mirror, a dimmer glass, and a meter, a brightness control element, e.g., an EL display element), number display utilizing a segment, and a display element such as an electrochromic display. Depending upon the state of EC layers constructing the EC element, the EC element can be roughly divided into a liquid type, a whole solid type, and the like. Amongst them, the liquid type EC element is that at least part of the EC layers should be composed of a liquid or a gel.

FIG. 7 shows a configuration of a typical liquid type EC element. Outlining the configuration, a lower glass substrate 1 having a lower electrically conductive film 3 and an upper glass substrate 2 having an upper electrically conductive film 4 are adhered by a sealing portion 5 in such a manner that the electrode films 3 and 4 reside in inner positions, respectively, and an EC solution 6 is injected and incorporated from an inlet for introducing an EC solution inlet (not shown) provided on a part of the sealing portion 5.

Upon applying a voltage between the lower electrically conductive film 3 and the upper electrically conductive film 4 of the EC element thus produced, an electrochemically reaction occurs within the EC solution 6, which is a chromic layer, to thereby color the element. Upon applying a voltage in the direction reverse to the coloration, the reverse reaction occurs to discolor the element.

In order to provide tapping electrode portions for connecting the lower electrically conductive film 3 and the upper electrically conductive film 4 to external wires, respectively, as shown in FIG. 8(1), these two glass substrates 1 and 2 each having an electrically conductive film are shifted with each other in a vertical direction shown in this figure; or as shown in FIG. 8(2), they are shifted with each other in an inclined direction shown in this figure. The exposed portions having width W1 and W2 are used as tapping electrode portions 1a and 1b, respectively, and the portions of the electrically conductive film portions exposed on the tapping electrode portions 1a and 1b are taken as tapping electrodes. Alternatively, as shown in FIG. 8(3), tapping electrodes are provided by changing the sizes of two glass substrates 1 and 2 each having an electrically conductive film (Japanese Patent Laid-Open No. 61-129626, Japanese Patent Laid-Open No. 63-249826, Japanese Patent Laid-Open No. 61-190528, and U.S. Pat. No. 5,668,663). The reason why the substrates are shifted with each other is that since the distance h shown in FIG. 6 between the substrates is practically very narrow in the EC element, it is difficult to be connected to the external wire, and particularly, it is not possible to fit a clip electrode etc. to the substrates provided vertically unless the substrates are shifted.

However, in such configurations as described above, the tapping electrode portions must be provided on at least two sides of the liquid type EC element. Since peripheral portions including the tapping electrode portions and the sealing portion are not an effective area, the providing of the tapping electrode portions on two sides unduly enlarges the areas of the tapping electrode portions and, thus, it is not preferable in terms of the ratio of the effective area. In the case where the peripheral portions including the tapping electrode portions and the sealing are required to be covered with a frame or such, if the areas of the tapping electrode portions are large, the area for covering the tapping electrode portions becomes large accordingly, which is not preferable in terms of appearance. In particular, in an electrochromic mirror for providing an automobile or such, the thickness of mirror ring (frame edge) covering the outer circumference of the mirror becomes large, which undesirably gives heavy impression.

SUMMARY OF THE INVENTION

In the present invention, since the tapping electrode portions are provided on one side of the liquid type EC element, the effective area of the liquid type EC element during the coloration and discoloration can be enlarged. By intensively arranging the tapping electrode portions on one side, the wiring becomes easy and the length of the wire can be shortened.

For example, in the case of the automobile antiglare mirror, the effective area for the mirror portion is increased to widen the effective view field, contributing the safety. What is more, a mirror ring which covers the outer circumference of the mirror can be made slim, enhancing a smart looking from the viewpoint of the design. Also, in comparison with the case where electrodes are tapped on two or more sides, the present invention makes it possible to secure the same effective view field with a lightweight.

Also, for example, if the EC element of the present invention is used for controlling the brightness of the luminophor element, by intensively arranging the tapping electrode portions on one side, the electrode can be tapped only within a restricted space, making it possible to control the brightness of luminophor element which requires the tapping of the electrode only from one side (such as meters and EL display elements), such a control being difficult in the prior art techniques.

BEST MODES FOR CARRYING OUT THE INVENTION

The present invention is characterized by providing a tapping electrode portion of a lower electrically conductive film and a tapping electrode portion of an upper lower electrically conductive film on one side of a liquid type EC element.

Figure 1:
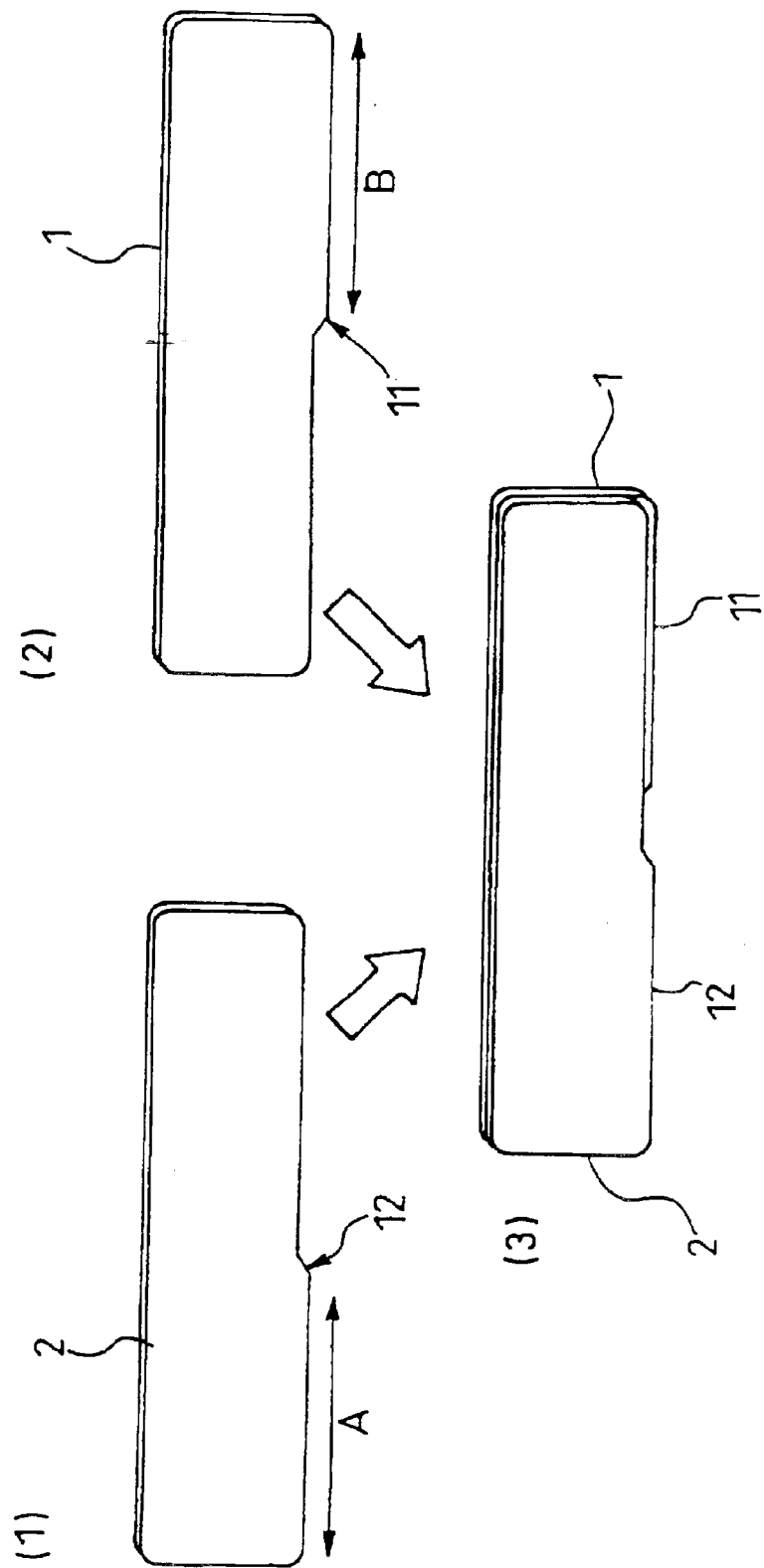
FIG. 1 is a plane view explaining the configuration of the electrochromic element according to one embodiment of the present invention.

In this case, a device is made to shapes of upper and lower substrates. For example, as shown in FIG. 1(1), a tapping electrode 12 of an upper substrate 2 is provided so that a part of one side of the upper substrate 2 is partially projected. Similarly, as shown in FIG. 1(2), a tapping electrode 11 of a lower substrate 1 is provided so that a part of one side of the lower substrate 1 is partially projected. At this time, as shown in FIG. 1(3), the lower tapping electrode portion 11 and the upper electrode portion 12 are provided respectively in such a manner that the upper and lower substrates 1 and 2 are placed without shifting them and the tapping electrode portion 11 and the upper electrode portion 12 are not piled up with each other viewing from the direction of laminating the substrates (the direction perpendicular to the surfaces of the substrates).

As described above, when the lower and upper tapping electrode portions 11 and 12 are provided on one side in such a manner that they are not piled up with each other, the ratio of the effective area can be increased and the area for covering the tapping electrode portions can be decreased in comparison with the technique that the upper and lower substrates are shifted with each other.

Also, since the areas of the tapping electrode portions can be decreased in comparison with the technique that the upper and lower substrates are shifted with each other, the weight of the EC element of the present invention can be decreased so much. Also, the weight can be decreased by diving the tapping electrode portion into two tapping electrode portions each having such size that one is not piled up with another.

Since the lower tapping electrode portion 11 and the upper tapping electrode portion 12 are positioned where they are not piled up with each other viewing from the direction perpendicular to the surfaces of the substrates, they can be connected via clip electrodes.

In the present invention, each tapping electrode portion can be formed by bonding a member for the formation of electrode (such as substrate piece) to a rectangular substrate, and the tapping electrode portion is preferably formed as a part of the substrate by processing the substrate from the viewpoints of the strength and cost.

By forming an electrically conductive thin film on the whole surface of each substrate processed as described above, a tapping electrode comprising the electrically conductive electrode film can be formed on each tapping electrode portion.

In the present invention, each tapping electrode portion is preferably connected to an external wire via a clip electrode from the viewpoints of the fact that connection can be carried out easily and securely. Also, in the case of an EC element for automobile application, the use of the clip electrode is preferred in terms of little possibility of contact failure and high reliability even in the case where it is used under the condition where vigorous vibration are always applied.

It is preferred for the present invention to provide each tapping electrode portion on one side of the long sides of the substrate, in which case the length and the area of each tapping electrode portion can be sufficiently secured and, thus, stabilization of the voltage, stabilization of coloration/discoloration, reliability and the response can fully secured.

In the present invention, the short length of the substrate (thin electrically conductive film) is preferably not more than 7 cm. Considering the resistance of the presently known thin electrically conductive film, if the short length exceeds 7 cm, it is difficult to secure stabilization of the voltage, stabilization of coloration/discoloration, reliability and response in a sufficient manner in the embodiment, the tapping electrode portions of the EC element are provided on one side according to the present invention. In similar viewpoints, the short length of the substrate (thin electrically conductive film) is more preferably not more than 6.5 cm, and still more preferably not more than 6 cm. For example, when both of the upper and lower electrically conductive films is transparent electrically conductive films, the EC element having the configuration shown in FIG. 2 or FIG. 3, which will be described later on, can be represented as a circuit diagram shown in FIG. 4. The charge is passed through resistors $a_1$ and $a_2$ of the upper transparent electrically conductive film and the through resistors $a_3$ and $a_4$ of the lower transparent electrically conductive film, where the amounts of the resistors as follows: $a_1 > a_2 > a_3 > a_4$. Consequently, since the stability of the voltage and the stability of the coloration/discoloration depend upon the distance from the tapping electrode, i.e., the distance between $a_1$ and $a_2$ and the distance between $a_3$ and $a_4$, these distances are preferably small.

In the present invention, the length of each tapping electrode portion (A and B in FIG. 1) can be freely modified. The length of each tapping electrode portion is preferably such a length that at least two clip electrodes can be fit. This is because the connection can be maintained even if one of clip electrodes becomes contact failure. Particularly, in the case of an EC element for an automobile application, the clip electrode has a higher possibility to be contact failure due to vigorous vibration, this is important. In the case of the EC element for automobile, a preferable number of the clip electrodes are from 20 to 40.

In the present invention, the length of each tapping electrode portion (A and B in FIG. 1) is preferably designed to be a proportion for attaining stabilized voltage and stabilized coloration/discoloration to meet the resistance of the thin film (face resistance). Specifically, for example, it is preferable for the length (area) of the tapping electrode portion of the transparent electrode such as ITO electrode to be as large as possible. In the case of the electrode which also severs as the reflecting film such as chromium, the length (area) of the tapping electrode portion may be smaller than the former. The resistance of thin film of the transparent electrode is higher than that of the electrode which also severs as the reflecting film.

In the present invention, the length or the area of one tapping electrode portion (A and B in FIG. 1) is preferably the same as that of the other for stabilizing the voltage and the coloration/discoloration, when both of the electrically conductive films comprise the same material.

Figure 2:
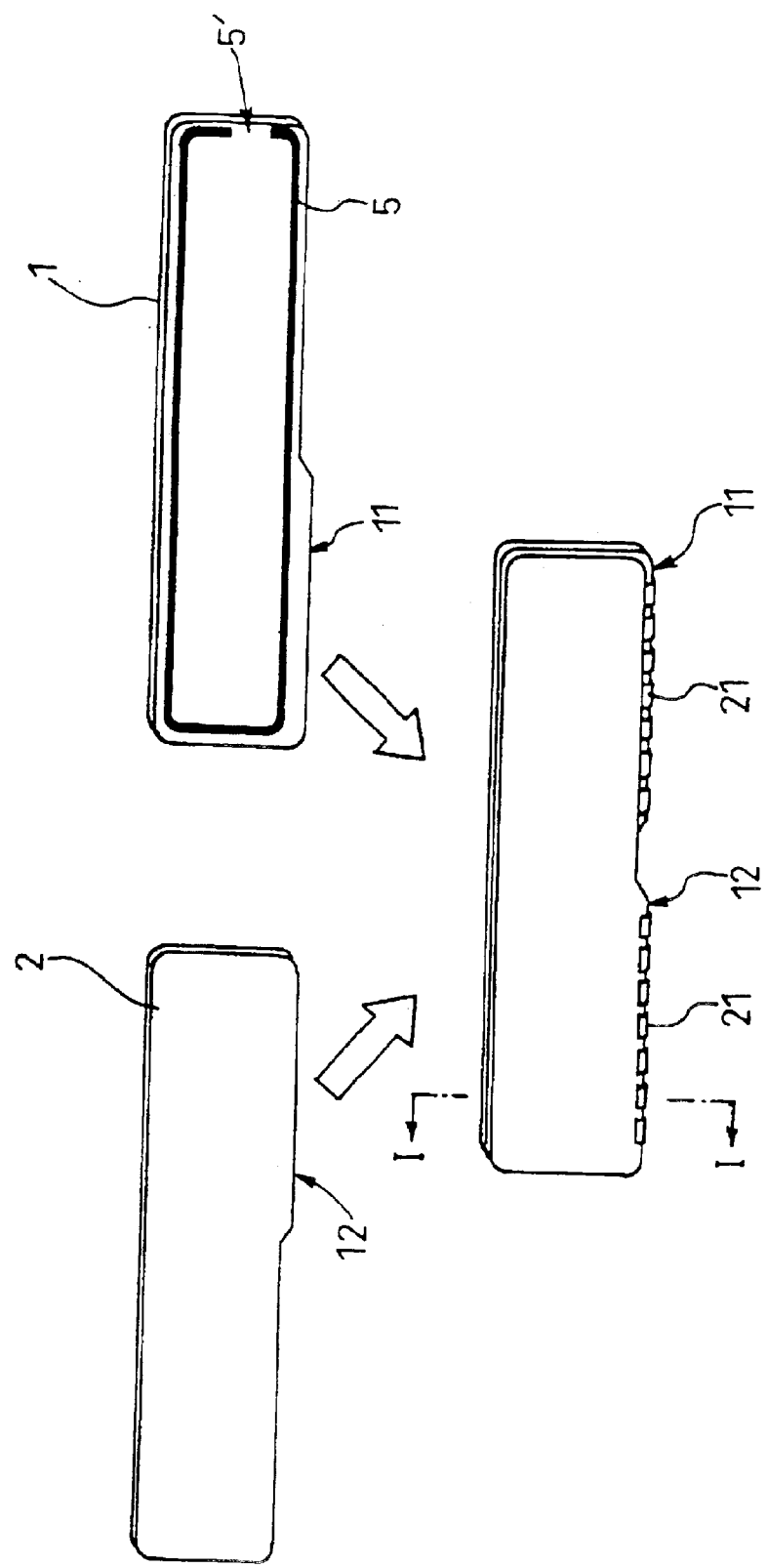
FIG. 2 is a plane view explaining the electrochromic element according to one embodiment of the present invention.
Figure 3:
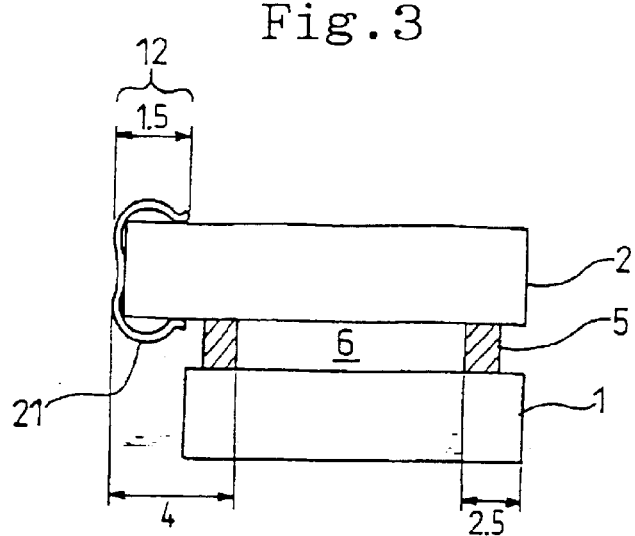
FIG. 3 is a cross sectional view of FIG. 2 taken along the line I—I.
Figure 4:
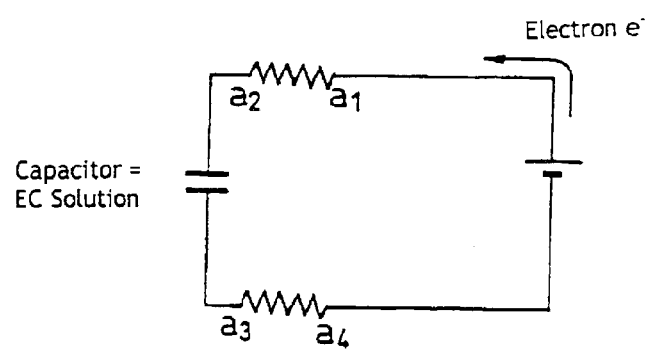
FIG. 4 shows a circuit of the electrochromic element according to one embodiment of the present invention.

FIG. 2 is a plane explaining the electrochromic element according to one embodiment of the present invention, and FIG. 3 is a cross sectional view of FIG. 2 taken along the line I—I.

As shown in FIGS. 2 and 3, the substrates are processed to prepare the substrates 1 and 2 having the tapping electrode portions 11 and 12, respectively. Subsequently, the thin electrically conductive film (not shown) is formed on the whole surface of each substrate to thereby the tapping electrode comprising the thin electrically conductive film on each of the tapping electrode portions 11 and 12. The substrates are adhered to each other by a sealing member 5 in such a manner that the electrically conductive layers reside in inner positions. From an inlet 5' for introducing an EC solution provided on a part of the sealing portion 5 is injected and incorporated an EC solution 6, after which the inlet 5' for introducing an EC solution is sealed. Next, a clip electrode 21 and wire (not shown) are connected to each of the tapping electrode portion 11 and 12, and the external wire is connected to the clip electrode 21 and wire.

Here, as shown in FIG. 3, for three sides where no tapping electrode portion 11 or 12 is formed, the width of the peripheral portion outside of the sealing portion 5 is set to be 2.5 mm, and for one side having the tapping electrode portion, the width of the tapping electrode portion is set to be 1.5 mm and the width of the peripheral portion outside of the sealing portion 5 is set to be 4.0 mm. As a result, the area of the peripheral area around the substrate outside of the sealing portion can be set at the smallest extent, and the area of the effective area inside of the sealing portion which exhibits the performance of the EC element can be set at the largest extent. It should be understood that these values are the most preferable valves in the present situation considering the high reliability, the width of the tapping electrode portion may be not less than 1.5 mm and the width of the peripheral portion outside of the sealing portion 5 may be not more than 2.5 mm, if one needs to obtain a normal level of the reliability. Similarly, in the case where the requirement for possessing the smallest area of the peripheral area around the substrate is not so high, the width of the tapping electrode portion may be not less than 1.5 mm and the width of the peripheral portion outside of the sealing portion 5 may be not less than 2.5 mm.

Figure 5:
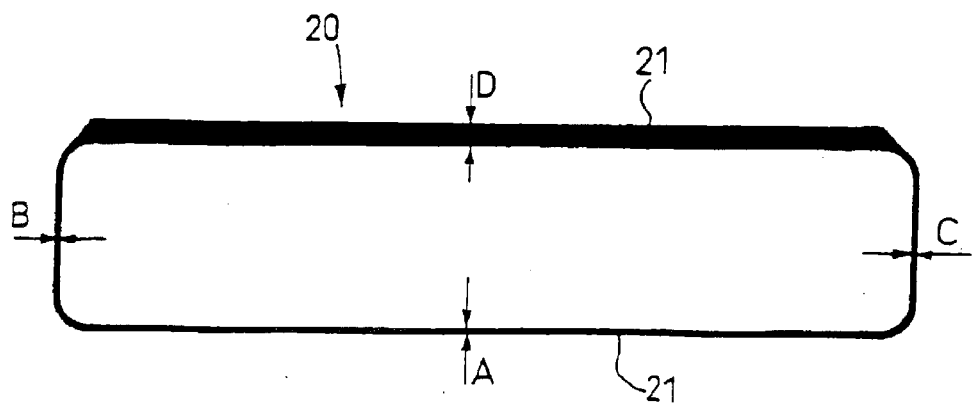
FIG. 5 is a plane view explaining the effect of the application of the present invention to an automobile antiglare mirror.

FIG. 5 is a plane view explaining the effect of the application of the present invention to an automobile antiglare mirror. As shown in FIG. 5, in a mirror ring 21, which covers the outer circumference of the substrate outside of the effective area of the mirror 20, in comparison with the width D of the mirror ring residing at one side on which the tapping electrodes 11 and 12 are formed, at least one of the widths A, B, and C of the remaining three sides can be decreased in comparison with the prior art. When the electrodes are tapped on two or more sides, the widths of two or more sides are the same as width D. As described above, according to the present invention, the mirror ring 21 can be made slim, improving apparent smartness. The effective view field is increased to contribute safety. Moreover, in comparison with the case of tapping electrode portions on at least two sides, the weight can be reduced with the same effective view field. As described above, the application of the present invention to the automobile interior mirror or exterior mirror is particularly preferable since these mirrors are required to appear to be smart. Also, as shown in FIG. 5, it is preferable that each of the tapping electrode portions resides on the side of the upper portion of the mirror at the time of fitting the mirror, because the mirror appears to be smarter if the tapping electrode area is placed on an upper portion of the mirror. Particularly, in the case of the interior mirror, even if the mirror ring above the mirror at the time of fitting the mirror is somewhat wide, the mirror which does not look strange is preferable. The electrochromic antiglare mirror is not restricted to a flat type mirror, and may be a curved type mirror.

In the present invention, an electrochromic layer is not specifically restricted as long as it is composed so that at least part of the EC layer comprises a liquid or a gel, and it should be produced by pacing the EC layer in-between the upper and the lower glass substrate each having an electrically conductive film.

Figure 6:
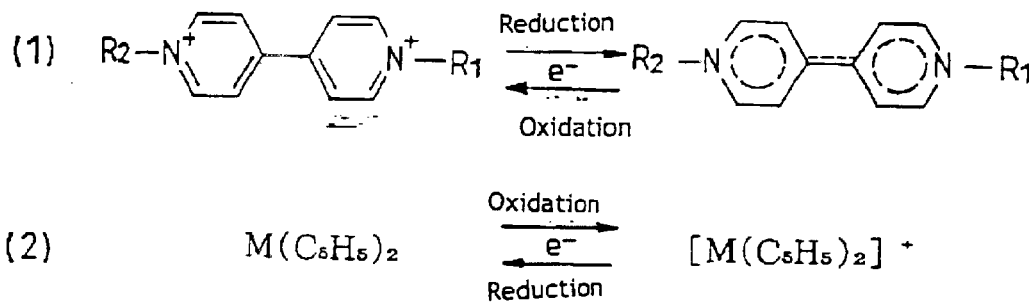
FIG. 6 is an explanatory view showing examples of the reaction formulae in the liquid type electrochromic layer.
Figure 7:
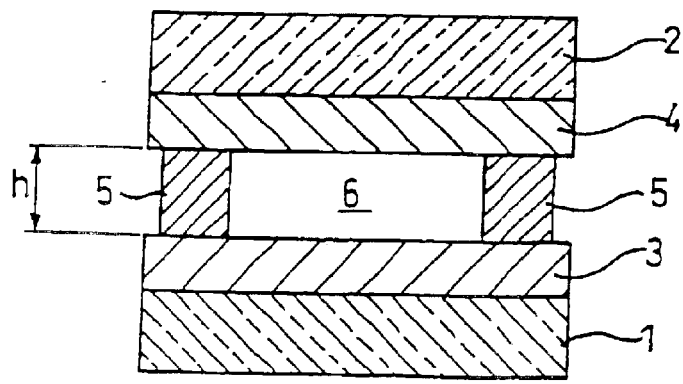
FIG. 7 is a cross sectional view showing the configuration of the liquid type electrochromic element.
Figure 8:
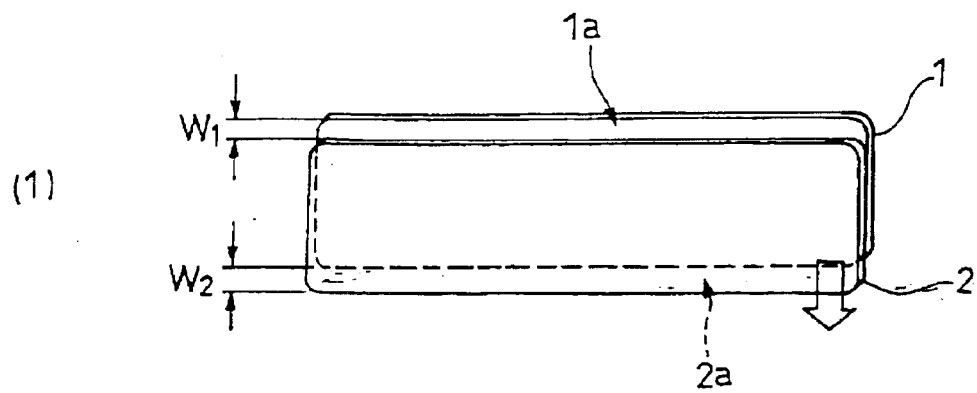
FIG. 8 is a plane view showing the conventional configuration of tapping electrodes.
Figure 8:
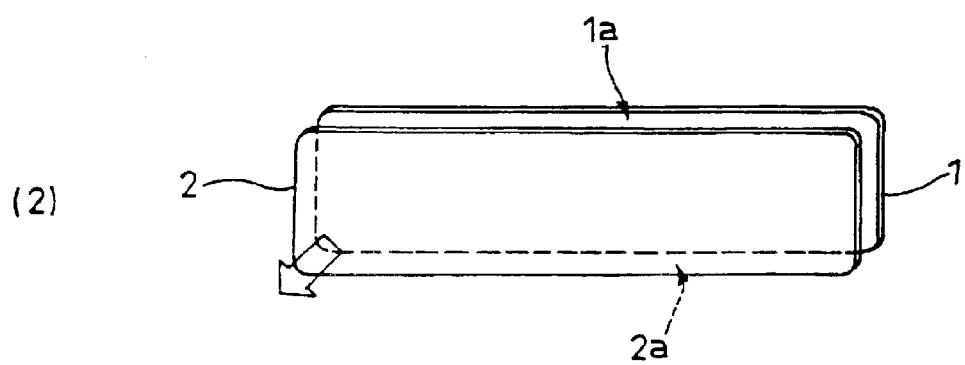
Figure 8:
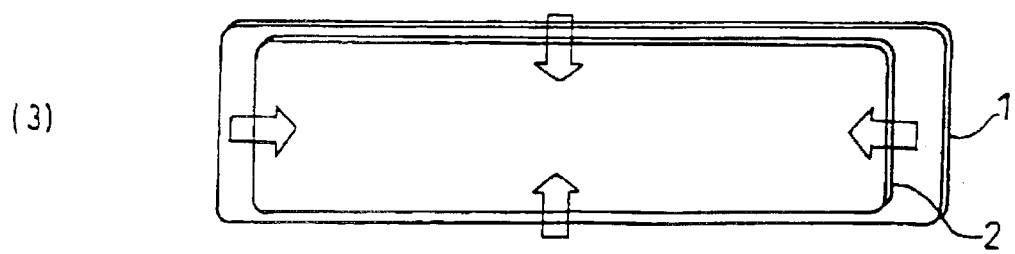

Specifically, for example, an electrolyte having a cathode compound such as a viologen derivative and an anode compound comprising methallocene ($M(C_5H_5)_2$) or a derivative thereof dissolved in a non-aqueous solvent can make up the EC layer. FIG. 6(1) shows a typical reaction formula in the cathode concerning a viologen derivative and FIG. 6(2) shows a reaction formula in the anode concerning methallocene. In the formula shown in FIG. 6(1), $R_1$ and $R_2$ are independently an alkyl group having 1 to 10 carbon atoms or a phenyl group, and in formula shown in FIG. 6(2), M represents a metal.

The EC substance in the liquid type EC include various substance other than viologen such as aromatic amines, redox complexes, phthalocyanine, heterocyclic compounds, fluorine, styryl, anthraquinone, diesters of phthalic acid, and the like. The electrolyte includes an aqueous or non-aqueous liquid (electrolyte) and a semi-solid (macromolecular electrolyte film).

Various electrically conductive metal film can be used as the devitrified electrically conductive film, and a metal film such as Al, Ag, or Cr can be used as he electrically conductive film which also severs as the reflecting film. As the transparent electrode film, a film made of ITO (indium/tin oxide), $SnO_2$, $InO_2$, ZnO, or such can be used. These electrically conductive films can be formed by any of known thin film formation processes such as deposition, ion plating, and plating processes.

EXAMPLE

A sample of an automobile interior mirror having a size of 250×50 mm was produced using an ITO film and a Cr film respectively as the upper and lower electrically conductive film, which was confirmed to vary the reflectance from 10% to 70%, and to satisfy the functions of the antiglare mirror.

In the sample of the transmission type EC element having a size of 250 mm×50 mm prepared using ITO film as both of the upper and lower electrically conductive films, transmission has been conformed to be changed from 20% to 80%, confirming that the brightness control function is fully satisfied.

The transmission type EC element is used for controlling the brightness of the luminophor element, by intensively arranging the electrode tapping on one side, the electrode can be tapped only within a restricted space, making it possible to control the brightness of luminophor element which requires the tapping of the electrode only from one side such as EL panel, such a control being difficult in the prior art.

INDUSTRIAL APPLICABILITY

The electrochromic element of the present invention is particularly available for use in an electrochromic antiglare mirror composed as an electrochromic mirror, particularly automobile inner and exterior mirror, and control of brightness and quantity of light of elements which is difficult to tap electrode from plural side depending upon its construction, such as chromic element required for tapping an electrode.

What is claimed is:

1. A liquid electrochromic device comprising:
   an upper glass substrate;
   a lower glass substrate;

an upper electrically conductive layer provided on the upper glass substrate and having a first short side and a first long side which is longer than the first short side, the upper electrically conductive layer having an upper tapping electrode portion provided on the first long side;

a lower electrically conductive layer provided on the lower glass substrate and having a second short side and a second long side which is longer than the second short side and which is positioned to correspond to the first long side, the lower electrically conductive layer having a lower tapping electrode portion provided on the second long side not to overlap the upper tapping electrode portion; and an electrochromic layer sandwhiched between the lower electrically conductive layer and the upper electrically conductive layer.

2. The liquid electrochromic device as claimed in claim 1, wherein each of the upper and lower tapping electrode portions is connected to an external wire via a clip electrode.

3. The liquid electrochromic device as claimed in claim 1, wherein lengths of the first and second short sides are at most about 7 cm.

4. The liquid electrochromic device as claimed in claim 2, wherein each of the upper and lower tapping electrode portions is so dimensioned that at least two clip electrodes are fit.

5. The liquid electrochromic device as claimed in claim 1, wherein each of the upper and lower tapping electrode portions is so dimensioned as to be able to stabilize voltage and coloration/discoloration of the electrochromic layer according to resistances of the upper and lower electrically conductive layers.

6. The liquid electrochromic device as claimed in claim 1, wherein the upper and lower electrically conductive layers are made from a substantially same material and wherein the upper and lower tapping electrode portions have substantially same dimensions.

7. The liquid electrochromic device as claimed in claim 1, wherein the liquid electrochromic device is a part of an automobile interior mirror or an automobile exterior mirror.

8. The liquid electrochromic device as claimed in claim 7, wherein the upper and lower tapping electrode portions are positioned on a side of an upper portion of the automobile interior mirror or the automobile exterior mirror.

9. The liquid electrochromic device as claimed in claim 1, further comprising:

a brightness controller configured to control brightness of a light-emitting element which requires the upper and lower tapping electrode portions be positioned on a one side of the liquid electrochromic device.

* * * * *